May 4, 1954 — L. DEWAN — 2,677,168
CONTROL DEVICE FOR AUTOMATIC MACHINERY
Filed April 4, 1950
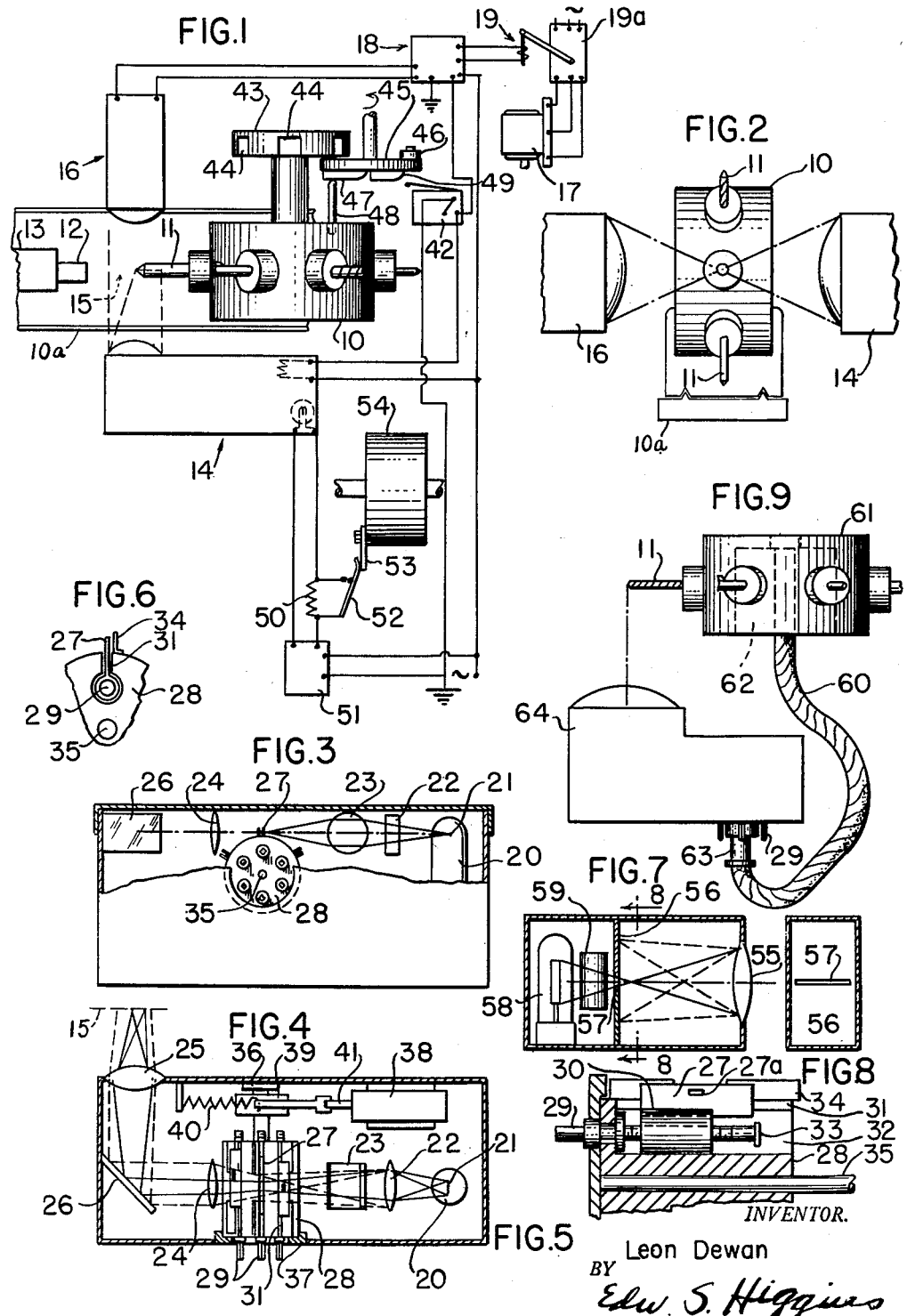
INVENTOR.
Leon Dewan
BY Edw. S. Higgins
ATTORNEY Patented May 4, 1954

2,677,168

UNITED STATES PATENT OFFICE 2,677,168

CONTROL DEVICE FOR AUTOMATIC MACHINERY

Leon Dewan, New York, N. Y., assignor of one-third to Milton H. Feig, Hempstead, and one-third to Frederick E. Hettling, Flushing, N. Y.

Application April 4, 1950, Serial No. 153,908

3 Claims. (Cl. 29—57)

This invention relates to automatic machine tools and has for its main object the prevention of time and material loss when a tool on such a machine breaks or is otherwise damaged.

In automatic lathes or screw machines, a number of tools are mounted on a revolvable turret and each tool is successively presented to the work. The tools may consist of drills, taps or turning tools. Occasionally a drill or tap will be driven back or broken. The result is that some of the succeeding tools will be broken or damaged as they are applied to the imperfect work. If an operator is tending several machines and is unaware of the happening, a considerable amount of imperfect work will be turned out by the lathe. Also renewing and resetting a number of tools entails additional time loss and expense as compared with the renewal of one broken drill.

According to this invention, a fine line of light is focussed along the center line of the tool, for example, a drill. The length of the light line can be varied until all or most of it is obscured by the body of the drill. If the drill is driven back or broken off, light will shine through the space thus formed and fall upon a photoelectric cell which will operate means to stop the machine or otherwise render the turret inoperative.

The bed 10a which carries the turret is provided with turret advancing mechanism of standard type well known in the art of automatic lathes.

A new or separate and individually adjusted line of light is thrown upon the tool center line for each tool that is successively presented by the turret. In operation, the light lines are changed in synchronism with the indexing of the turret and the tool is "examined" briefly by the light system at the point of withdrawal from the work when the turret is about to turn and present the next tool.

In the drawings, Fig. 1 is a diagrammatic top plan view of a screw machine embodying one form of my invention.

Fig. 2 is a fragmentary detail view of the turret of Fig. 1 looking from the left.

Fig. 3 is an enlarged detail view of the light unit, parts being broken away.

Fig. 4 is a cross sectional view of the light unit of Fig. 3.

Fig. 5 is a fragmentary sectional view showing the means for actuating the shutters.

Fig. 6 is a view looking from the right of Fig. 5.

Fig. 7 is a vertical sectional view of the photoelectric cell unit, on the line B—B of Fig. 8.

Fig. 8 is a vertical sectional view on the line A—A of Fig. 7

Fig. 9 is a top plan view of a turret embodying a modified form of the invention.

Referring to Figs. 1 and 2, the turret 10 which rotates in the vertical plane carries six tools 11, one of which tools (which may be a drill) being shown presented to the work. The turret is mounted in the usual way to advance and apply the tool to the stock or work 12 supported by the spindle 13 and then withdraws to the position shown to index one sixth of a turn to present the next tool as is usual.

The light unit 14 containing a lamp and suitable lenses focusses a beam to produce a fine line of light along the central axis of the tool. This light line when fully extended reaches point 15, Fig. 1. In the drawing, the light line has been shortened to fit tool 11 and is consequently obscured thereby. If such tool 11 is driven back or is broken when applied to the work, light passing through the space formed when the turret has reached the position shown would reach the photoelectric unit 16. This unit will then either stop the motor 17 which runs the machine by acting through the amplifier 18 and the solenoid 19 to operate the motor switch 19a, or it will disengage the turret drive clutch usually provided in such machines.

The long light line before adjustment allows for variations in tool lengths as short tools are generally farther away from the stock than the long tools when the turret is indexed.

The light unit 14 is shown in detail in Figs. 3 to 6, inclusive, and consists of a lamp 20 having a linear filament 21, cylinder lenses 22 and 23, spherical lenses 24 and 25 and a mirror 26 to deflect the light beam toward the tool. The lenses 22 and 23 focus an elongated but narrower image of the filament 21 on a shutter 27 which is one of six similar shutters mounted in spaced relation circumferentially around the shutter wheel 28. The lenses 24 and 25 focus an enlarged image of this on the tool center line.

Each shutter 27 is provided with a small rectangular opening 27a so as to permit only a small portion of the length of the light line at a time to pass and be focussed on the tool. It is of course possible to have the shutter 27 short and merely expose varying lengths of the light line focussed in its plane. The provision of the shutter as shown accomplishes the same result in effect but reduces the chance of stray light and consequent inaccurate or false operation.

Shutter 27 can be moved along the axis of the shutter wheel 28 manually by turning the square head of the screw 29 which engages the nut 30 which holds the shutter 27, said shutter extending through and riding in a paraxial slot 31 in the shutter wheel 28. This slot 31 permits the shutter to project beyond the periphery of the shutter wheel and ride freely therealong. The movement of the shutter 27 in effect varies the length of the filament image on the tool center line as described.

The head of screw 29 is swiveled in the face wall of the shutter wheel in the end of the hole or slot 32 and a projection 33 at the end of the screw limits the motion of the nut 30. A secondary shutter 34 having a central opening a little shorter than the shutter 27 prevents extraneous light from reaching the front lenses. The shutter wheel is mounted on shaft 35 supported in the bearing 36 at one end. The large recesses bearing 37 supports the wheel at the other end and permits access to the screw heads for manual adjustment thereof.

The shutter wheel 28 is indexed by means of the solenoid 38 and a pawl and ratchet mechanism 39. Since the pawl and ratchet mechanism is well known, the details are omitted for the sake of clarity. The shutter wheel is indexed one sixth of a turn when the solenoid 38 is deenergized and the spring 40 acts to pull the armature 41 back.

Referring to Fig. 1, the photoelectric system comprising cell unit 16 and amplifier 18 is operative only at very brief periods preceding the turning of the turret. This operation is controlled by the microswitch 42 which connects line voltage to the plate circuits of the amplifying tubes. This switch also connects line voltage to the solenoid 38.

A turret is usually indexed by means of a Geneva movement as illustrated consisting of an attached disc 43 having six radial slots 44 and another engaging disc 45 having a roller 46 mounted thereon. A complete revolution of disc 45 causes the roller to engage a radial slot 44 and index the turret one-sixth of a turn. A cam 47 on disc 45 operates a tapered pin 48 which holds the turret locked until the instant before the roller 46 begins to turn the turret. According to the invention, an additional cam 49 is associated with disc 45 to operate the microswitch 42 in the following manner:

Some time after the disc 45 begins to turn for indexing, the cam 49 engages the switch 42 to close the same and render the photoelectric system operative and also to energize the solenoid 38. When the roller 46 reaches the bottom of the slot 44 and the tapered pin 48 snaps out of the turret the switch 42 is snapped off by the cam 49 at the same time. The photoelectric system immediately becomes inoperative and the release of solenoid 38 causes indexing of the shutter wheel 28 while the turret is turning. A new shutter 27 that has been adjusted for the next tool now determines the length of the light line for the tool when it comes into place.

Thus even if light from the filament image shines on the photocell as the turret is changing tools, no false operation or shut down of the machine results since the photoelectric system is inoperative.

A machine tool operation may be set in the usual manner. When the machine is slowly rehearsed in operation by hand there comes a point for each position when the tapered pin 48 clicks as it snaps out of the turret. The machine is stopped at this point and the light line is adjusted in length for the tool in position. Since the period of operation of the photoelectric system is very brief and since its activation may be determined at the last moment preceding disconnection by the switch 42, it is desirable that the amplifier 18 be energized by rectified D. C. currents and include a thyratron type of tube to operate the magnetic switch positively if the tube is activated. Such amplifiers will operate within a few microseconds and being well known need no detailed description.

The type of exciter lamp 21 available for this work has a short life (about 100 hours) if operated continuously at its rated intensity. To increase the lamp life, the filament is kept at a lower temperature by means of the resistance 50 in series with the supply transformer 51. This temperature is low enough to greatly increase the lamp life but sufficiently high so as to reach the rated point in a little less than one-half second when the microswitch 52 closes and shorts out the resistance 50.

The switch 52 may be operated by dogs 53 on the dog carrier 54 that commonly makes one revolution for a complete operation of the machine. The dogs are set to close the switch a half second before the moment that the switch 42 snaps off. The temperature of the lamp will then reach the full operating point just previous to the moment that switches 42 and 52 snap off.

In the photocell unit 16 illustrated in Fig. 7 and Fig. 8, the lens 55 collects light and forms a reel image upon the mask 56 of the scene including the filament image at the tool center line when it is exposed. The slit 57 in the mask is positioned where the image of the filament falls and may be somewhat narrower than the same to be selective. The slit allows light to pass therethrough and be concentrated upon the photocell 58 by means of the cylinder lens 59. However any light sources or lamps elsewhere in the scene will be excluded by falling on different parts of the mask. Thus the chance of false or inaccurate operation of the device is greatly reduced. This also makes it possible to use a sensitive photocell amplifier and reduce the light intensity requirement so that a very fine light line may be used to work with the thinnest drills and taps. It is preferred that the photocell 58 be of a type whose response peaks in the infra red (about 8000 A.) as infra red light is less likely to be blocked by any liquid coolant which may deposit on lenses 25 and 55.

Fig. 9 illustrates a modification of the invention wherein the shutter wheel 28 may be driven directly by the turret without need of a solenoid and indexing mechanism. A flexible cable 60 is secured at one end to the turret 61 within the recess 62 (shown in dotted lines) generally provided in such turrets. The other end of the cable joins the shaft 63 on which a shutter wheel similar to wheel 28 is mounted. The light unit 64 may be similar to unit 14 in other respects except that it lacks the solenoid 38 and indexing mechanism 39.

I claim:

1. In a control device for an automatic machine tool having a turret with a plurality of tool positions, a sensory means consisting of a longitudinal real image focussed substantially in the plane of the tool, means for variably positioning said central image along the central axis of a tool and a photocell normally excluded by the tool from receiving light from said real image, and means whereby change of position of the tip of a tool from normal will admit light to the photocell and cause said sensory means to render said turret inoperative.

2. In a control device for an automatic machine tool having a turret with a plurality of tool positions, sensory means adapted to sense the position of the tip of a tool placed in working position by the turret, means for automatically changing the position of the sensory means to correspond with the length of tools successively placed in working position by the turret, and means controlled by said sensory means for rendering the turret inoperative in response to a change from normal of the position of the tip of a tool.

3. A device for an automatic turret machine tool consisting of means for directing a beam of light upon a turret tool, means for adjusting the position of the light beam in respect to the length of a turret tool whereby a change from normal position of the tip of a tool will permit light to pass the tool, photoelectric means to receive the light and render the turret inoperative and means for automatically changing the position of the light beam in accordance with the turning of the turret to correspond with the length of tools successively placed into working position by the turret.

References Cited in the file of this patent

UNITED STATES PATENTS

| Number | Name | Date |
| --- | --- | --- |
| 1,289,390 | Colleson | Dec. 31, 1918 |
| 1,981,147 | Moller | Nov. 20, 1934 |
| 2,249,121 | Drescher | July 15, 1941 |
| 2,339,773 | Egan | Jan. 25, 1944 |
| 2,340,547 | Mikami | Feb. 1, 1944 |